(12) United States Patent
Naghian

(10) Patent No.: US 6,792,248 B1
(45) Date of Patent: Sep. 14, 2004

(54) METHOD FOR CONTROLLING TRANSMISSION POWER IN WCDMA SYSTEM

(75) Inventor: Siamäk Naghian, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/743,458
(22) PCT Filed: Jul. 14, 1999
(86) PCT No.: PCT/FI99/00626
§ 371 (c)(1), (2), (4) Date: Jan. 10, 2001
(87) PCT Pub. No.: WO00/04649
PCT Pub. Date: Jan. 27, 2000

(30) Foreign Application Priority Data

Jul. 16, 1998 (FI) .................................................. 981625

(51) Int. Cl.⁷ ............................................... H04B 1/00
(52) U.S. Cl. ........................................ 455/69; 455/522
(58) Field of Search ........................... 455/69, 522, 436, 455/574, 513

(56) References Cited

U.S. PATENT DOCUMENTS

| | | | |
|---|---|---|---|
| 5,305,468 A | | 4/1994 | Bruckert et al. |
| 5,542,111 A | | 7/1996 | Ivanov et al. |
| 5,623,486 A | | 4/1997 | Dohi et al. |
| 5,805,995 A | * | 9/1998 | Jiang et al. .................. 455/436 |
| 5,924,043 A | * | 7/1999 | Takano ........................ 455/522 |
| 6,317,587 B1 | * | 11/2001 | Tiedemann, Jr. et al. ..... 455/69 |

FOREIGN PATENT DOCUMENTS

| | | |
|---|---|---|
| EP | 0230691 | 8/1987 |
| EP | 0428099 | 5/1991 |
| EP | 0667726 | 8/1995 |
| EP | 0682419 | 11/1995 |
| EP | 0683570 | 11/1995 |
| EP | 0802638 | 10/1997 |
| FI | 865149 | 6/1987 |
| FI | 86352 | 5/1991 |
| FI | 935105 | 11/1993 |
| WO | WO 98/10530 | 3/1998 |

OTHER PUBLICATIONS

Siegmund Hüttig: "Technik der Netze", 4$^{th}$ ed., Heidelberg, 1999, pp. 572–635, technique of the nets.

Printout of http://www.0700info.de/wwwww.html.

* cited by examiner

Primary Examiner—Nay Maung
Assistant Examiner—Tu Nguyen
(74) Attorney, Agent, or Firm—Pillsbury Winthrop LLP

(57) ABSTRACT

A method for controlling transmission power in a radio system and in a WCDMA system network in particular for maximizing cell capacity. An acceptable transmission power margin and an optimum power level, which may change specifically for each connection and service class, are determined for the transmission power. Transmission power is adjusted using power control steps utilizing an incoming power control command and previous power control steps. The power control step size is adjusted as a sum of a fixed and a variable dynamic step size where the dynamic value is obtained on the basis of the measured value and the target value of the signal-to-noise ratio. Information on the network state can be obtained by comparing AC and LC data and the cell capacity can be maximized by controlling the amount of transmission power calculated by the mobile station before the final power transmission.

12 Claims, 4 Drawing Sheets

METHOD FOR CONTROLLING TRANSMISSION POWER IN WCDMA SYSTEM

This application is the national phase of international application PCT/FI99/00626 filed Jul. 14, 1999 which designated the U.S, and that international application was published under PCT Article 21(2) in English.

BACKGROUND OF THE INVENTION

The invention relates to a method for controlling transmission power in a radio system and in a WCDMA system in particular where transmission power is controlled by means of power control steps. In this system the step size of a transmission power change is adjusted using a fixed step size or dynamically using a variable step size. An acceptable threshold value of the transmission power may vary specifically for each connection.

The WCDMA (Wideband Code Division Multiple Access) is a modulation and multiple access technique based on a well-known spread spectrum-theory, where the data transmitted by a transmitter is spread into a frequency range and identified using a code. The power of the WCDMA system must be controlled in order to maximize the operation thereof. Firstly, all powers transmitted by mobile stations should be substantially equal at the base station irrespective of multipath propagation. Secondly, only the minimum power required for reliable data transmission is allowed from the base station transmitter so that as many users as possible can share the same cell.

The WCDMA system power control can be divided into three parts. In the downlink power control, from a base station to a mobile station, the base station constantly reduces its output power until the mobile station requires for more power. The total power of the base station can thus be kept low and the capacity of one cell can be maximized without disturbing other cells.

The uplink power control, from a mobile station to a base station, is composed of an open-loop power control and a closed-loop power control. In the open-loop power control the mobile station estimates signal attenuation on a radio channel and on the basis thereof roughly adjusts its output power.

Since the radio channels in the downlink and uplink directions are at different frequencies, the open-loop estimate for signal attenuation is not necessarily accurate in the uplink direction. In the closed-loop power control the base station measures the power level of the mobile station transmission and sends a command bit to the mobile station, on the basis of which the mobile station increases or reduces the transmission power.

The closed-loop power control can be carried out using a fixed step size or dynamically using a variable step size. In the fixed step size power control the base station measures the relative power level of each mobile station signal and compares it to a threshold value. A power control command is sent to the mobile station, for example, at 1.25 ms intervals, according to which the mobile station increases or reduces the transmission power by a predetermined amount, for example 0.5 dB.

Maintaining the power control step size constant causes problems in situations where the signal or the interference level change occasionally but not constantly. If the power control in a radio system is carried out using a large fixed step size, a strong fluctuation of the power used around the desired power level becomes a problem. If the step size of the power control is small there is a risk that the power control algorithm cannot follow the rapid variations in the signal-to-interference ratio International patent application PCT/WO97/26716 A Method for Controlling Transmitting Power and a Radio System is an example of a prior art implementation of dynamic power control. In said application the dynamic power control is carried out on the basis of several received successive power control commands in such a manner that the number of two successive diverging commands is calculated from the power control commands to be examined in proportion to the number of commands to be examined, and the calculated proportion is compared to one or more predetermined reference values and the step size is adjusted on the basis of said comparison.

Problems with the above dynamic power control system are that the transmission power of the mobile station exceeds an optimal value and that the mobile station disturbs the surrounding mobile stations and that the system does not maximize the cell capacity.

BRIEF DESCRIPTION OF THE INVENTION

It is an object of the invention to provide a method for controlling transmission power in a WCDMA system and an apparatus implementing the method so as to achieve a balanced radio system and an improved capacity. The objects of the invention are achieved with a dynamic power control method and a WCDMA system, characterized by what is disclosed in the characterizing portions of the independent claims.

The advantage with the dynamic power control method and the WCDMA system is that power consumption is reduced in a first radio unit and therefore saves the battery of the first radio unit in case that the first radio unit is a mobile station, as the method according to the dynamic power control based on a signal-to-interference ratio (SIR) optimizes the transmission power change and the optimum power level of the transmission power is achieved irrespective of the network state and the subscriber terminal service class.

The advantages of the preferred embodiments of the invention are that the invention takes into account the WCDMA system and the services offered thereby and that signalling is reduced as unnecessary cycles are removed. In addition, the method of the invention rapidly responds to fast radio network changes, is flexible, does not cause additional signalling at the air interface between the base station and the mobile station and takes multimedia transfer requirements (for example, Quality of Service QoS) into account.

In the invention, after the power transmitted by a first radio unit, for example by a mobile station, and received by a second radio unit, for example a base station, is compared to an upper limit and a lower limit of a power margin, and when the power exceeds the upper limit of the power margin or when the power goes below the lower limit of the power margin, a command correspondingly reducing or increasing power is issued to the first radio unit at a first rate. The power control command can, for instance, be a command bit or command bits. The first radio unit can also transmit power control commands to the second radio unit.

In a preferred embodiment of the invention the second radio unit also compares the measured signal strength to an optimum value and if the measured signal strength exceeds or goes below said optimum value, the second radio unit correspondingly issues a command to the first radio unit to reduce or increase the power of the transmitted signal at a second rate which is lower than the first rate.

In another preferred embodiment of the invention forthcoming and previous power control commands and previous power control steps are taken into account when calculating the amount of power increasing or reducing the transmission power of the first radio unit.

In a further preferred embodiment of the invention the power level is not changed, if the power control commands are repeated in turns as a sequence of power control commands increasing and reducing power. If a power control command that only increases power or reduces power is repeated in the power control sequence, then the power control cycle can be delayed.

In a still further preferred embodiment of the invention the amount of power increasing or reducing the transmission power of the first radio unit is calculated as a sum of the dynamic variable step and the pre-calculated fixed step.

Still according to a preferred embodiment information is obtained by comparing Admission Control (AC) and Load Control (LC) parameters, or data, on whether a change is taking place in the radio network that would affect the set value of the first radio unit power control, and when the change takes place, for example when a new high-speed connection is established, a theoretically appropriate offset can be determined for the transmission powers of existing connections, the offset enabling the transmission powers thereof to be appropriate also after initiating the operation of a new connection in the changed network. By comparing AC and LC data and by using soft handover, if the first radio unit so desires, a balanced radio system and an improved capacity are achieved.

According to the invention the acceptable upper and lower limits of the transmission power of a particular service class and the optimum power level can change specifically for each connection and service class.

The technique of the invention can also be reversely applied in such a manner that the first radio unit controls the transmission power of the second radio unit, although in order to illustrate the description only a situation where the second radio unit controls the transmission power of the first radio unit is described in more detail.

BRIEF DESCRIPTION OF THE DRAWINGS

In the following the invention will be described in greater detail in connection with the preferred embodiments with reference to the accompanying drawings, in which.

DETAILED DESCRIPTION OF THE INVENTION

Figure 1:
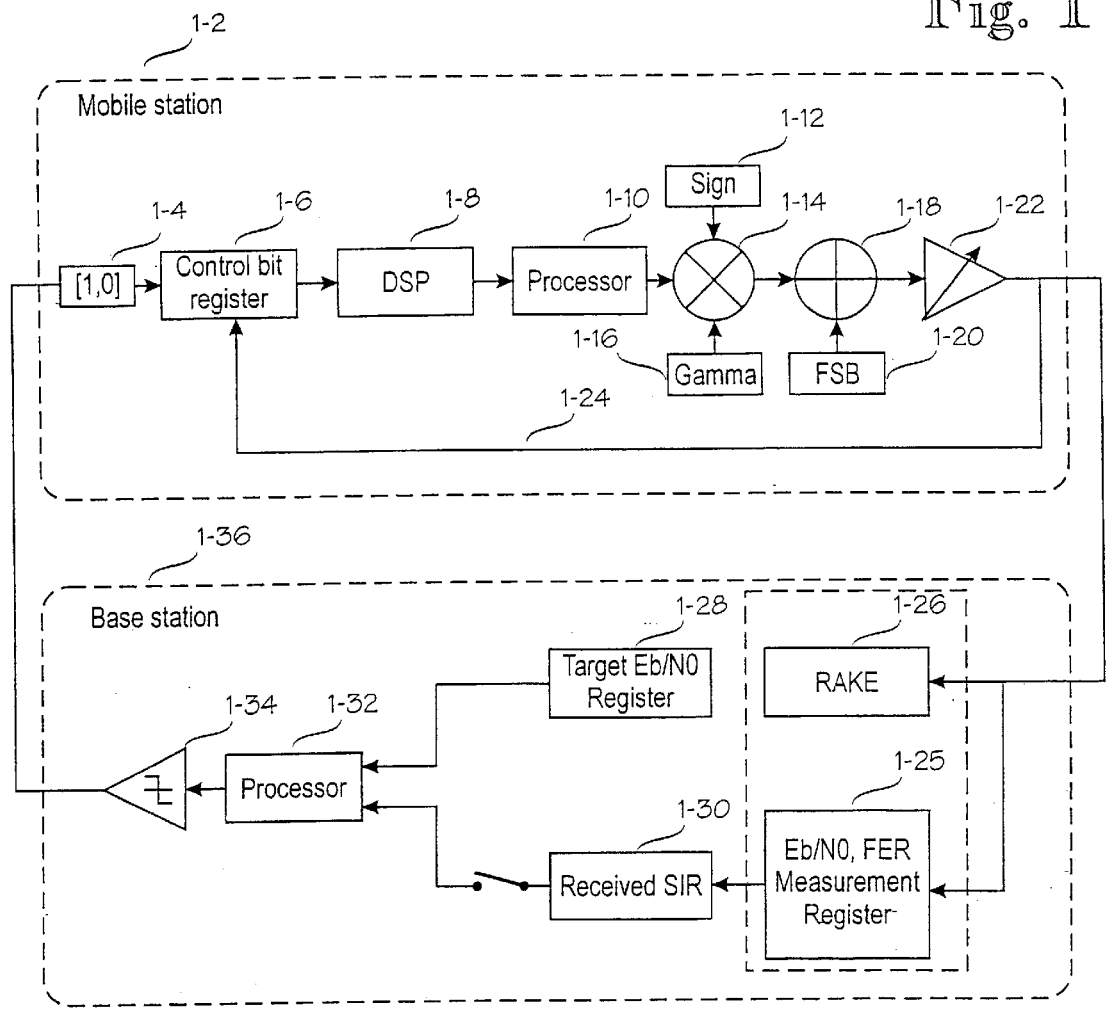
FIG. 1 shows essential parts of a mobile station/base station system of the invention, FIG. 2 graphically shows how a power level is set in relation to time.

The system in FIG. 1 illustrates the structure of a mobile station MS 1-2 and a base station BS 1-36 of the invention. FIG. 1 shows how the base station 1-36 receives signals transmitted by the mobile station and tends to keep the received signal strength constant by sending power control commands to the mobile station. In FIG. 1 the power control commands are assembled to a vector 1-4 which the mobile station registers into a command bit register 1-6. A digital signal processor DSP 1-8 analyses the command bit vector 1-4 and a controller 1-10 performs calculation and comparison. Then, control transmission means 1-12 . . . 1-22 adjust and control the power of the mobile station.

The mobile station employs a feedback 1-24 to store previous power control-values and power control steps into the command bit register 1-6 to be used for calculating the dynamic step.

An implementation is shown at a base station block 1-36 comprising a measurement register 1-25 and a RAKE receiver with multiple branches 1-26. Data is assembled to the measurement register on radio measurements, for example, on $E_b/N_O$ (Bit Energy to Noise Ratio), SIR (Signal to Interference Ratio) and FER (Frame Error Rate) measurements for calculating a power margin, for instance. The RAKE receiver connects the various branches of a received signal.

A processor 1-32 in the base station block compares measured quantities, for example, the received signal-to-interference ratio, a SIR value 1-30 and destination quantities, like the bit energy to noise ratio, an $E_b/N_O$ ratio 1-28. Thereafter a base station transmitter 1-34 sends a power control command to the mobile station 1-2 in order to increase or reduce power.

Figure 2:
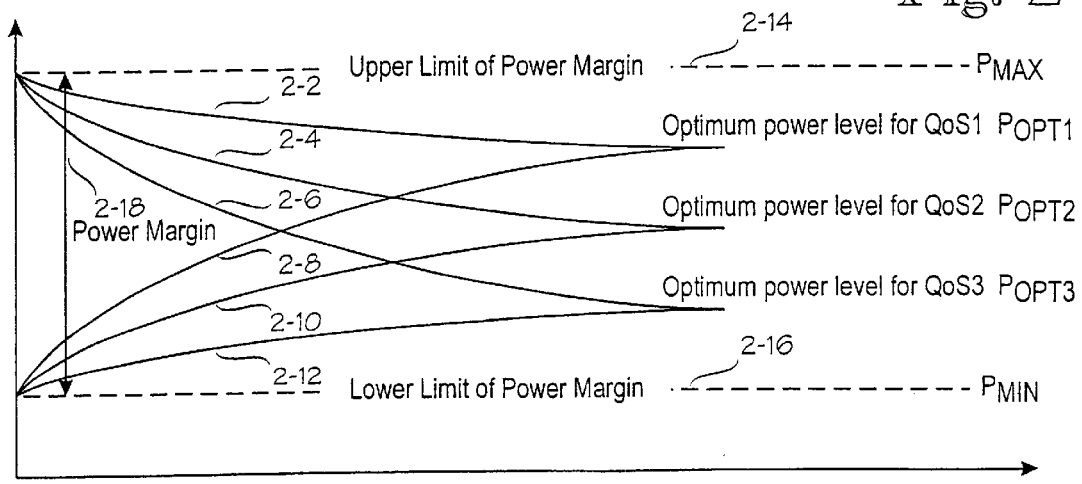

FIG. 2 graphically shows how the transmission power level of the mobile station is controlled in relation to time. Instead of a one point power level, or a threshold value of the power level, a power margin having an upper limit value and a lower limit value can be determined in the WCDMA system of the invention. In addition each service, like speech, data and image, have specific optimum transmission power levels, i.e. optimum power levels, which the mobile station approaches from above or below.

Curves 2-2 and 2-8 show the approach of an optimum power level Popt1 of a quality of service class QoS1 from above and below, curves 2-4 and 2-10 show the approach of an optimum power level Popt2 of a quality of service class QoS2 from above and below and curves 2-6 and 2-12 show the approach of an optimum power level Popt3 of a quality of service class QoS3 from above and below. An upper limit value (Pmax) of the power margin is indicated by 2-14 and a lower limit value (Pmin) of the power margin is indicated by 2-16. An acceptable power margin 2-18 is obtained by the difference between the upper limit value and the lower limit value.

The power margin in FIG. 2 can be determined using service class requirements, real-time radio measurements, for example SIR or $E_b/N_O$ measurements, and parameters balancing the network in close co-operation with AC and LC parameters. In contrast to previous prior art systems the previous values of power control steps stored in the command bit register 1-6 are also taken into account when determining the transmission power of the radio transmitter of the invention. The change history of the register comprises data on the latest power control command increasing or reducing power, on two to eight, preferably eight, power control commands preceding the latest power control command and two to eight, preferably eight, power control steps preceding the latest power control step. The upper limit value of the power margin depends on the load and interference level of the radio network.

The optimum power levels of different power control service classes can be determined on the basis of the mean of previous power control steps or the ratio of the measured value ($SIR_{real}$) and the target value ($SIR_{target}$) of the signal-to-interference ratio in close co-operation with the AC and LC parameters. The data concerning whether all data modes are included in the mobile station transmission or whether the mobile station transmission employs a different route and resource for speech than for data also affect the determination of the optimum power level. The optimum power levels of different power control service classes are thus determined as a result of the negotiations concerning network situation, capacity and transmission signal, and are not necessarily the lowest possible power levels but as the term indicates optimum power levels. The negotiations may take place in the beginning of the connection and again during the connection, if needed.

The acceptable upper and lower limit values of the transmission power, the power margin and the optimum power level may change specifically for each connection and service class.

Figure 3A:
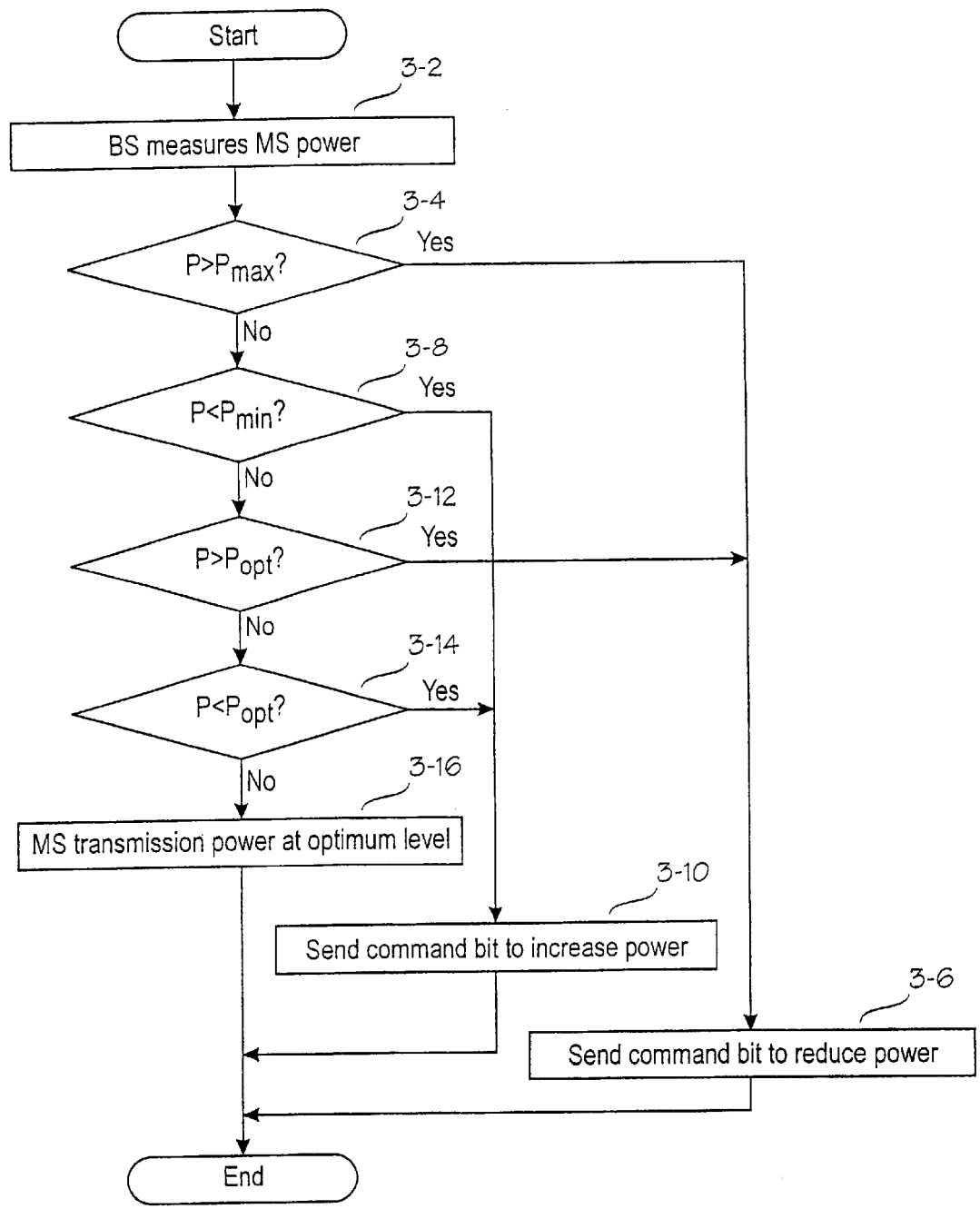
FIG. 3A is a flow chart showing a dynamic power control algorithm from the base station side.

FIG. 3A is a flow chart illustrating a dynamic power control algorithm according to a preferred embodiment of the invention from the base station side. In step 3-2 the base station BS receives a signal transmitted by the mobile station MS, and thereafter in step 3-4 the signal power (P) is compared to the upper limit value (Pmax) 2-14 of the power margin 2-18. If the received power exceeds the power margin upper limit value (P>Pmax) 2-14, the base station sends a power control command to the mobile station in step 3-6 to reduce transmission power. If the received power goes below the power margin upper limit value, the process proceeds to step 3-8 where the power is compared to the power margin lower limit value (Pmin) 2-16. If the received power goes below the lower limit value 2-16 of the power margin 2-18 (P<Pmin), the base station sends a power control command to the mobile station in step 3-10 to increase transmission power.

When the mobile station transmission power is within the power margin 2-18, the transmission power is compared to the optimum power level (Popt) of the desired service class that the mobile station is approaching from above or below until the power received by the base station and transmitted by the mobile station is at a predetermined distance from the optimum power level.

In step 3-12 the mobile station signal power is compared to the optimum power level (Popt1, Popt2 or Popt3, in general Popt) of the desired service class, for example QoS1, QoS2 or QoS3. If the received power exceeds the optimum power level of the desired service class (P>Popt), the base station sends a power control command to the mobile station in step 3-6 to reduce transmission power. If the received power does not exceed the optimum power level of the desired service class the process proceeds to step 3-14. If the received power goes below the optimum power level of the desired service class (P<Popt) the base station sends a power control command to the mobile station in step 3-10 to increase transmission power. Otherwise the transmission level of the mobile station is at a predetermined distance from the optimum power level of the desired service class and the process proceeds to step 3-16.

Figure 3B:
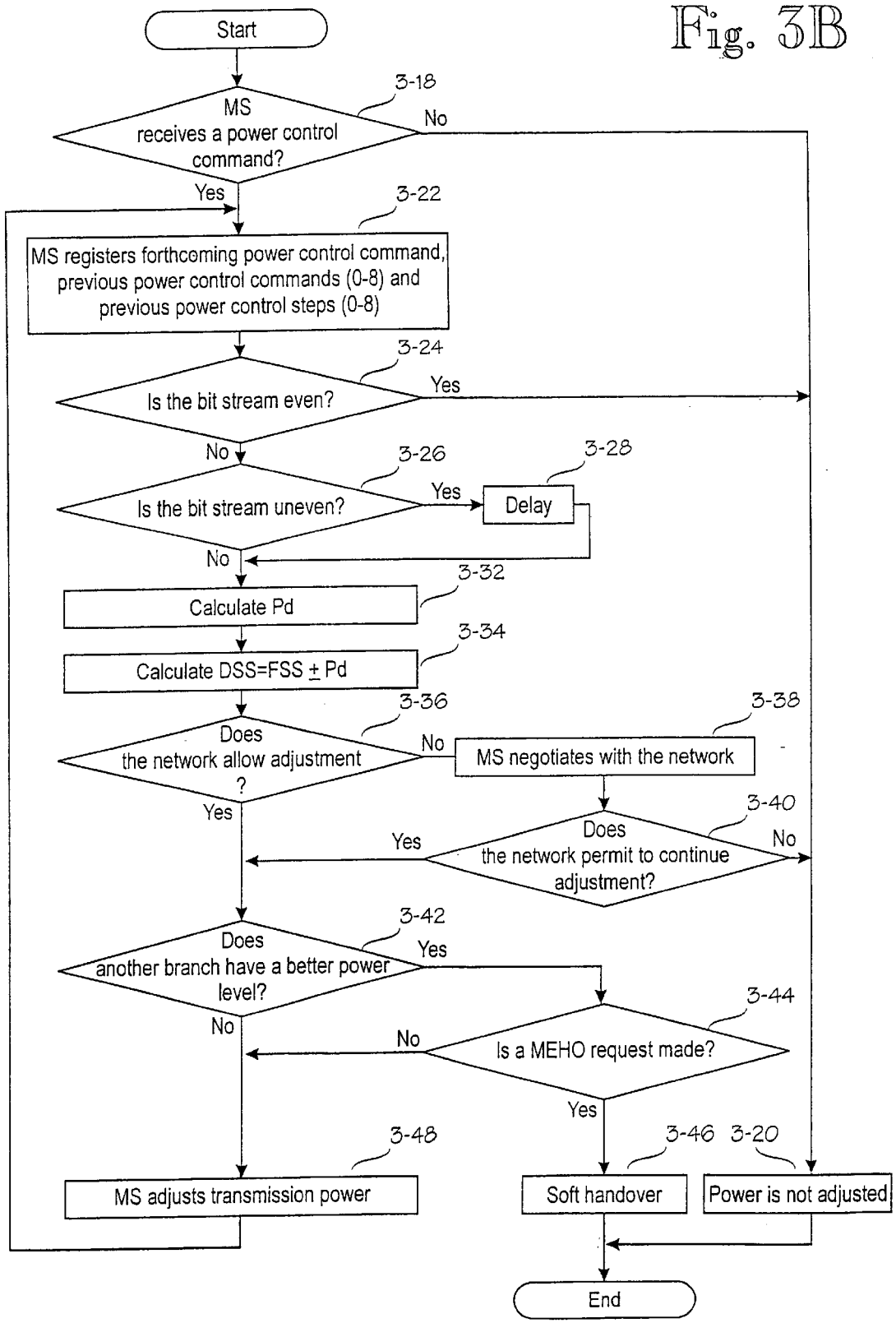
FIG. 3B is a flow chart showing a dynamic power control algorithm from the mobile station side.

FIG. 3B is a flow chart illustrating a dynamic power control algorithm according to a preferred embodiment from the mobile station side. In step 3-18 the mobile station receives said power control command from the base station. In step 3-22 the mobile station registers the forthcoming power control command into the command bit register 1-6. Said change history can also be stored therein including data on the latest power control command increasing or reducing power, on two to eight, preferably eight, power control commands preceding the latest power control command and on two to eight, preferably eight, power control steps preceding the latest power control step.

In step 3-24, the mobile station goes through the power control command values, or power control command stream, included in the change history. If the power control command stream is even, i.e. the power control commands alternate evenly, for example 10101010, the power level is not changed but is kept stable and the process proceeds to step 3-20 in the flow chart. If the power control command stream is not even, the process proceeds to step 3-26, where it is checked whether the power control command stream is uneven, i.e. if only one of the power control commands is repeated often, preferably more than three times in a row, for example 01000010. The power control is then changed to an outer slower power control that reduces air interface signalling. A slower power control is described in the flow chart and consists of a delay in step 3-28.

If the power control command stream is not even nor uneven but the power control commands are repeated irregularly, like 01101000, then the process proceeds directly from step 3-26 to step 3-32 where a fast power control without delay takes place.

Fast and slow power control both take into account the speed by which the mobile station moves. Fast power control can, for example, be 0.5 ms long and slow power control 10–20 ms long. During the power control a transition from slow power control to fast power control or vice versa may occur. In fast power control, the power control can be implemented in such a manner that the AC and LC data are not taken into account.

In step 3-32 the step size logic of the mobile station calculates a dynamic variable step (Pd) based on the ratio of the measured value and the target value of the signal-to-interference ratio, the $E_b/E_O$ measurements and the forthcoming power control command. A gamma coefficient (γ) used for calculation takes into account, for example, a model formed of previous power control commands, i.e. the power control command stream, previous power control steps, the type of RAKE receiver and various system parameters. An initial value which can constantly be changed depending on the network situation is determined for the coefficient in the network planning stage. The coefficient can also be determined directly, for example, on the basis of the mean of the previous power control steps or the distribution of the bit stream.

The dynamic part of the mobile station power control step is calculated using formula (1).

$$\pm Pd = \left(\frac{SIR_{real}}{SIR_{target}}\right) \cdot \gamma = \left((sign)\frac{\left(\frac{E_b}{N_0}\right)_{real}}{\left(\frac{E_b}{N_0}\right)_{target}}\right) \cdot \gamma \qquad (1)$$

When the size of the dynamic power control step is calculated the mobile station determines in step 3-34 the value of the entire power control, i.e. the power control step, according to the combined effects of the fixed value caused by the slow signal changes and the variable value of the power control in accordance with formula (2).

$$DSS = FSS \pm Pd \qquad (2)$$

In formula (2) a DSS (Dynamic Step Size) describes the entire power control step, a FSS (Fixed Step Size) the fixed value of the power control and a Pd (Dynamic Part of Step Size) the variable dynamic value of the power control. The FSS value in formula (2) takes into account, for example the effect of obstacles in the terrain on the signal path and the near-far phenomenon. The FSS value is determined according to network parameters and is typically, for example 0.5 dB.

By combining formulas (1) and (2) the value of the power control step can be calculated using formula (3).

$$DSS = FSS \pm Pd = FSS \pm \left(\frac{SIR_{real}}{SIR_{target}}\right) \cdot \gamma = FSS + \left((sign)\frac{\left(\frac{E_b}{N_0}\right)_{real}}{\left(\frac{E_b}{N_0}\right)_{target}}\right) \cdot \gamma \quad (3)$$

The value of the gamma coefficient used in the power control formulas always exceeds or equals zero. The gamma coefficient obtains a value that exceeds zero until the mobile station power is at the optimum level i.e. the measured value equals the target value. Then the gamma coefficient obtains the value zero. If the gamma coefficient obtains the value zero, the value of the power control step will be FSS according to formula (3). However, the power control of the mobile station does not have to increase power, if the same stable situation frequently reoccurs, i.e. the mobile station power remains at the optimum level.

The sign of the ratio between the SIR values in formula (3) is negative, when a power control command is sent to the mobile station to reduce power. Then the transmission power of the mobile station received by the base station has been too high in relation to the upper limit value of the power margin and the optimum power level of the desired service class. The sign of the ratio between the SIR values in formula (3) is positive, when a power control command is sent to the mobile station to increase power. Then the transmission power of the mobile station received by the base station has been too low in relation to the lower limit value of the power margin and the optimum power level of the desired service class.

In order to achieve a balanced and efficient radio system the mobile station negotiates in steps 3-36 . . . 3-40, with the network about the power to be transmitted. If the network does not allow the calculated power control step, for example an increase in the mobile station power would interfere with other mobile station signals, then the network can in step 3-36 prevent the power increase, for example on the basis of an AC parameter. The process then proceeds to step 3-38 where negotiations on increasing power are initiated.

If the network permits in step 3-40 to proceed with the power control or if the network allows the calculated power control step, the process proceeds to step 3-42. The mobile station compares the calculated power to the power of other branches by default in step 3-42. If the mobile station is also on the border of another cell or other cells than the specific base station and another branch has a better optimum power level within the power margin, the mobile station can make a MEHO request (Mobile Evaluated Handover) in step 3-44 to provide soft handover in step 3-46. If the MEHO request is not sent or if the power level of the other branches is not better, the mobile station adjusts the transmission power as described above in step 3-48.

After a possible MEHO request the mobile station employs AC and LC parameters in the downlink direction in step 3-46 and possibly issues a handover command to the mobile station. The base station controller uses AC, LC, HC and PC parameters in the downlink direction. In the uplink direction it is possible to change to an outer and slower power control in order to negotiate with the base station. If the AC and PC parameters are available to the mobile station, said data can if necessary be used during the MEHO request.

Figure 4:
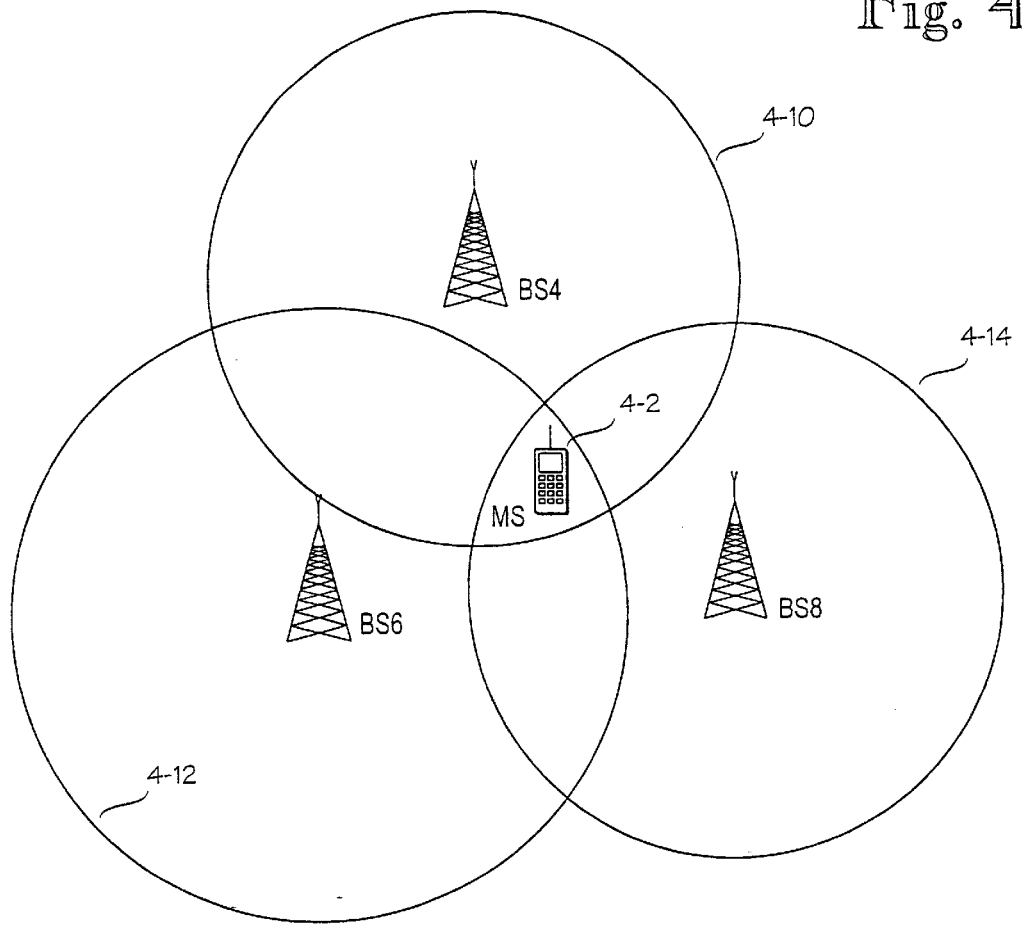
FIG. 4 shows a handover situation, in which a mobile station is under the influence of several base stations.

FIG. 4 shows a handover situation in a macro diversity area, or in a situation where the mobile station is under the influence of several base stations. When the mobile station is in a border area 4-10 of a specific cell, the mobile station can also be inside other cells in the border areas 4-12, 4-14 of said cells. Then the mobile station listens to a specific base station BS4 and to other base stations BS6, BS8 in the vicinity of the specific cell. Since each cell sends power control commands for controlling the power of a specific branch, the mobile station has to know whether to increase or to reduce the transmission power.

After having reduced the transmission power in step 3-34 the mobile station negotiates with the network and then in order to optimize handovers the mobile station decides whether to increase or reduce power on the basis of the AC and LC parameters irrespective of whether the mobile station has received a power control command to increase or reduce power. In addition, power control conflicts between different branches can be eliminated, when the power control decisions are made on the basis of the AC and LC parameters.

Figure 5:
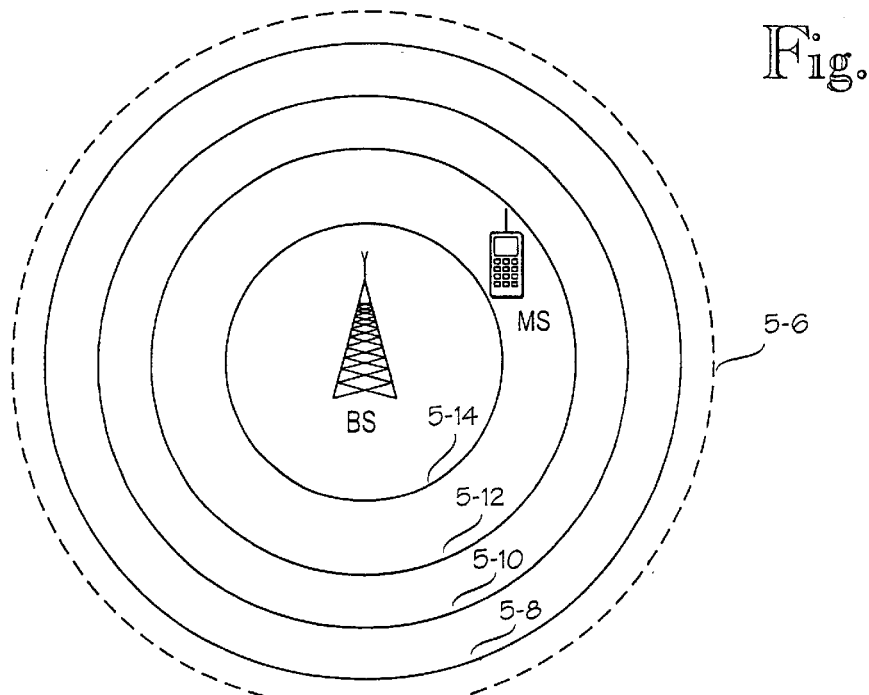
FIG. 5 shows the classification of base station cell power.

FIG. 5 shows the classification of the base station cell power. When applying the technique of the invention reversely in such a manner that the mobile station adjusts the base station transmission power, the mobile station MS sends power control commands, for example bits, to the base station BS in order to increase or reduce power. The base station cell 5-6 is divided into SIR spheres or SIR classes 5-8 . . . 5-14. Then the mobile station knows what the SIR ratio of the base station transmission signal should be at the mobile station. The mobile station thus measures the base station signal and compares it to the SIR value in the mobile station area. If the base station signal value goes below or exceeds a local SIR value, the mobile station sends a corresponding command to the base station to increase or to reduce power. The power level classification thus enables to control the reduction and enlargement of a cell.

It is obvious for those skilled in the art that the basic idea of the invention can be implemented in various ways. The invention and the preferred embodiments are thus not restricted to the above examples but can vary within the scope of the claims.

What is claimed is:

1. A method for adjusting transmission power in a first radio unit when controlling a second radio unit where the first radio unit receives power control commands of the second radio unit and based thereon adjusts the transmission power in power control steps, wherein the first radio unit maintains history data comprising a plurality of the latest received power control commands and a plurality of the latest power control steps, the first radio unit forms the power control steps based on said history data, the history data comprises two to eight latest power control commands and power control steps, and if the power control steps in said history data alternate substantially evenly upwards and downwards the first radio transmitter will not change the transmission power.

2. A method as claimed in claim 1, characterized in that if the power control steps alternate upwards and downwards in said history data in such a manner that one direction occurs successively more frequently, the first radio transmitter delays the power control in order to reduce air interface signalling.

3. A method as claimed in claim 1, characterized in that the power control step is calculated as the sum of a variable part and a fixed part.

4. A method as claimed in claim 1, characterized in that the power control step is calculated on the basis of a measured value and a target value of the signal-to-interference ratio.

5. A method as claimed in claim 1, characterized in that the power control step is calculated on the basis of the mean or the distribution of the history data.

6. A method as claimed in claim 1, characterized in that the transmission power in an active branch of the first radio unit in a multi-branched system is compared to the transmission power of other branches and if another branch has a better transmission power level the first radio unit sends a handover request.

7. A method as claimed in claim 1, characterized in that the first radio unit is located in the mobile station and the second radio unit in the fixed part of the mobile network.

8. A method as claimed in claim 1, characterized in that the first radio unit is located in the fixed part of the mobile network and the second radio unit in the mobile station.

9. A method as claimed in claim 1, characterized in that AC (Admission Control) and LC (Load Control) parameters are maintained, and by comparing said parameters data is obtained whether a change is taking place in the radio network which would affect a set value of the first radio unit power control and when such a change occurs a correction factor is determined to correct the first radio unit transmission power.

10. A method as claimed in claim 1, characterized in that the mobile station listens to a specific base station and other base stations located in the vicinity of the specific cell and that for optimizing handovers the mobile station decides to increase or reduce power on the basis of the AC parameter irrespective of whether the mobile station has received power control commands to increase or reduce power.

11. A method as claimed in claim 1, characterized in that at least some of the cells are divided into SIR spheres, or SIR classes.

12. A method as claimed in claim 11, characterized in that the mobile station knows a standard value of the SIR ratio of the base station transmission signal at the mobile station and that the mobile station compares the current value to a standard value and if the value of the base station signal is below or exceeds the SIR value in the mobile station area, the mobile station sends a corresponding power control command to the base station to increase or reduce power in order to control reduction and enlargement of the cell.

* * * * *